Dec. 8, 1964    A. S. WHEELBARGER ETAL    3,160,256
ANTI-JAMMING MANUAL PARKING METER
Original Filed Jan. 13, 1959    6 Sheets-Sheet 2

INVENTORS
ALBERT S. WHEELBARGER
GEORGE RUCK

BY

ATTORNEYS

Dec. 8, 1964   A. S. WHEELBARGER ETAL   3,160,256
ANTI-JAMMING MANUAL PARKING METER
Original Filed Jan. 13, 1959                           6 Sheets-Sheet 3
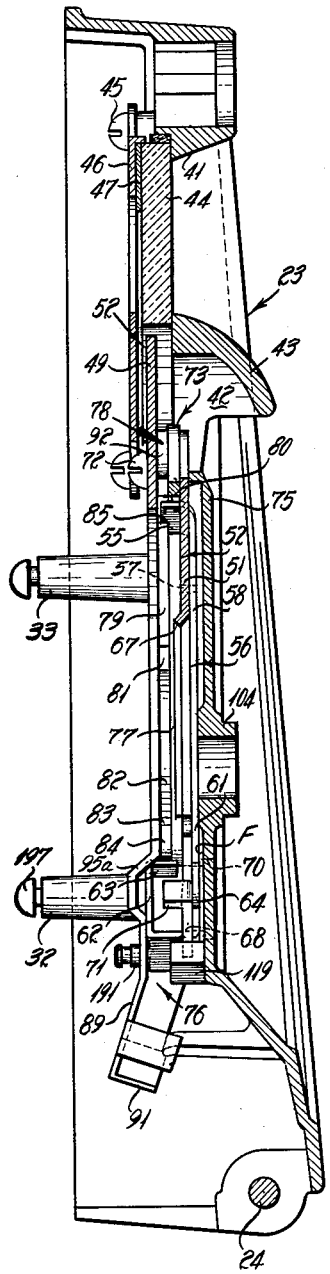
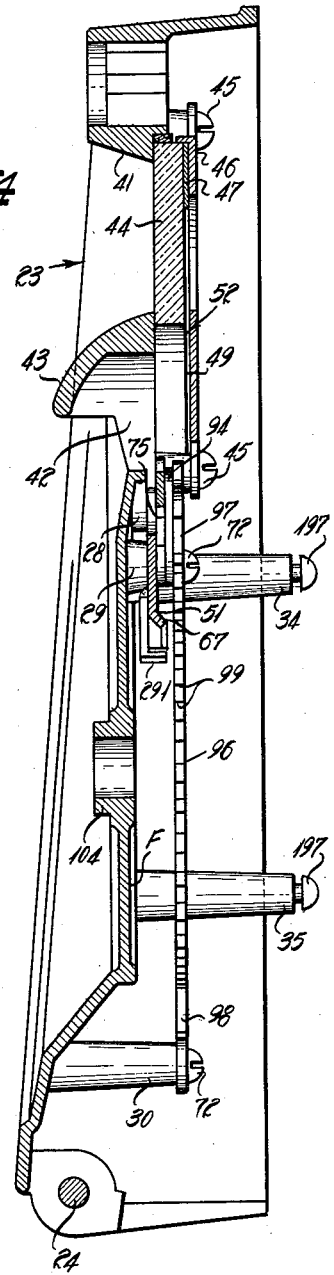
Fig. 3
Fig. 4
INVENTORS
ALBERT S. WHEELBARGER
GEORGE RUCK
BY Strauch, Nolan & Neale
ATTORNEYS

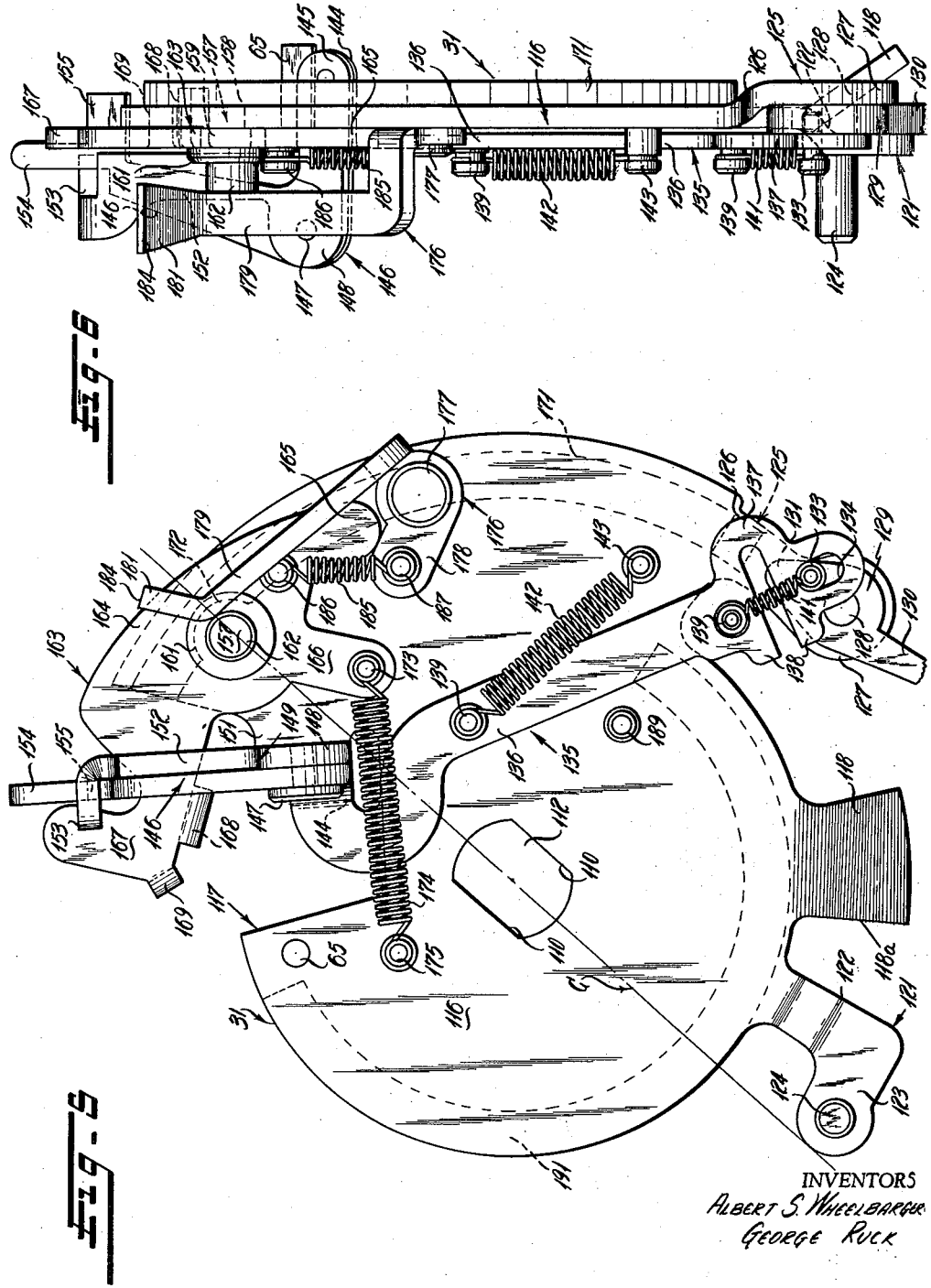

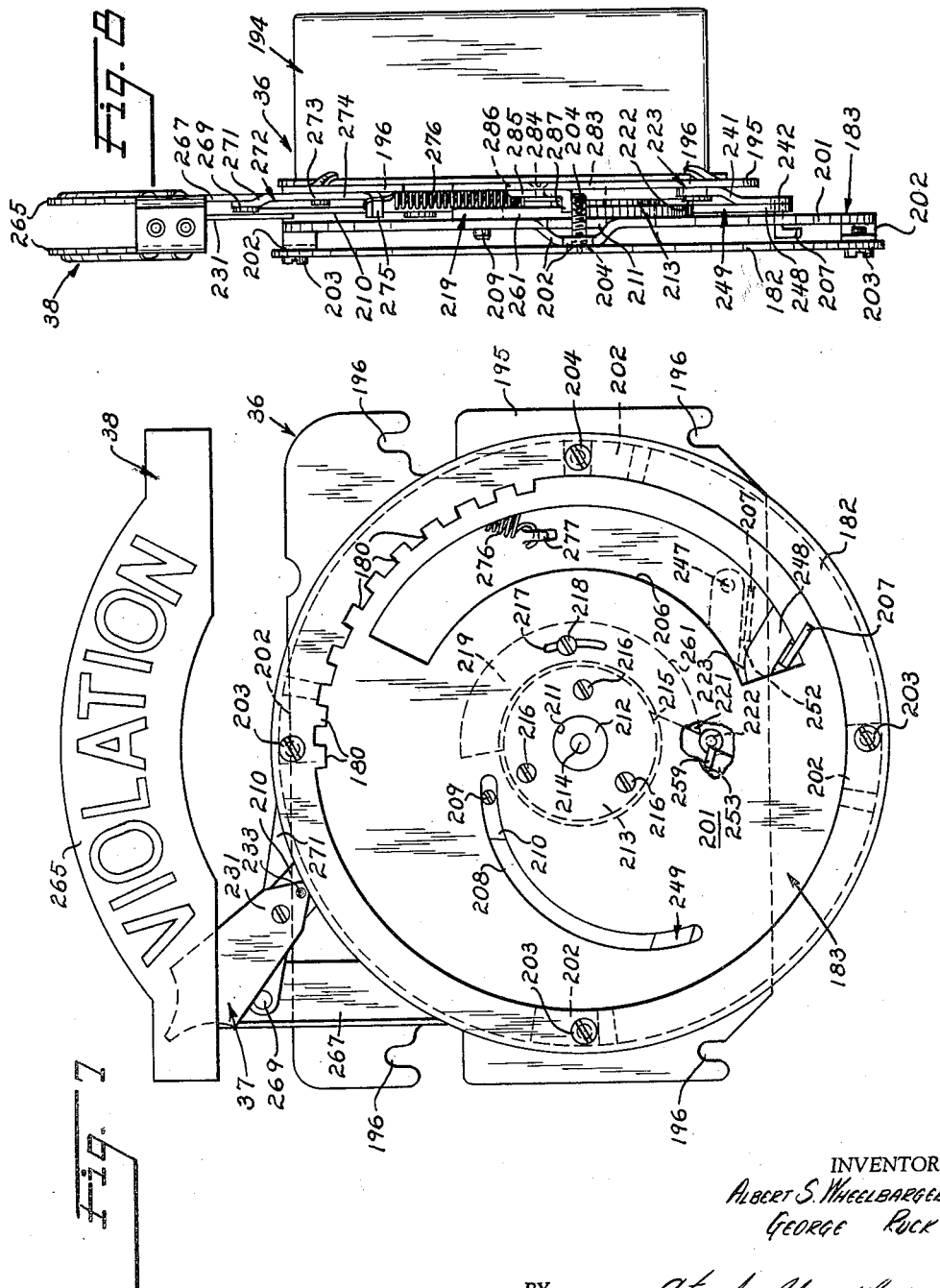

Dec. 8, 1964   A. S. WHEELBARGER ETAL   3,160,256
ANTI-JAMMING MANUAL PARKING METER
Original Filed Jan. 13, 1959                   6 Sheets-Sheet 6

INVENTORS
ALBERT S. WHEELBARGER
GEORGE RUCK

BY
ATTORNEYS

United States Patent Office 3,160,256
Patented Dec. 8, 1964

3,160,256
ANTI-JAMMING MANUAL PARKING METER
Albert S. Wheelbarger, Statesboro, Ga., and George W. Ruck, Bethel Park, Pa., assignors to Rockwell Manufacturing Company, Pittsburgh, Pa., a corporation of Pennsylvania
Continuation of application Ser. No. 786,488, Jan. 13, 1959. This application June 14, 1961, Ser. No. 117,196
18 Claims. (Cl. 194—72)

The present invention relates to parking meters and more particularly to improvements in the coin handling and setting mechanism adapted to simplify the mechanism for handling multiple coins, assure accurate setting of the timing mechanism and avoid jamming of the meter either because of the freezing of the coin in the mechanism or oscillation of the manual coin feeding crank in an attempt to procure time in addition to that actually warranted by the value of the deposited coin.

The present invention is an improvement upon that mechanism disclosed in United States Letters Patent No. 2,755,904 issued July 4, 1956 in the name of C. M. Moore et al. and assigned to the assignee of this application and pending application Serial No. 479,994 entitled Parking Meters, filed January 5, 1955, now U.S. Patent No. 2,906,386 in the name of Charles M. Starkey and owned by the assignee of this application and is filed as a continuation of copending application Serial No. 786,488 entitled Anti-Jamming Manual Parking Meter filed January 13, 1959 to replace the latter application.

It is a primary object of the present invention to provide a coin chute extending between the coin insertion slot and a point adjacent the coin receiving box which will have minimal contact with the faces of the various coins thereby avoiding jamming of the coin in the mechanism as a result of icing conditions in cold weather or improper manipulation of the manual winding crank and to simplify the chute mechanism and the coin driving mechanism provided to propel the coin along the chute to effect a setting of the timing mechanism.

Still another object of the present invention is to provide a coin chute for a parking meter having a minimal contact with the faces of the various sized coins to eliminate jamming of the coins due to icing in cold weather and a positive ejection mechanism operated by a newly deposited coin in its travel along the chute under influence of the rotation of the manual winding mechanism to positively eject an immediately preceding displayed coin from the meter "bull's-eye" window into the coin receiving box.

Still another object of the present invention resides in providing a parking meter coin actuated drive mechanism with anti-backup lever mechanism for preventing oscillatory operation of the setting crank and coin drive means during movement of the coin through the coin chute in an attempt to secure additional unpaid-for time.

Still a further object of the present invention is to provide a manually set parking meter with a novel violation flag linkage adapted to maintain the violation flag in its inoperative hidden position only when the coin actuated drive mechanism is in its normal coin receiving inoperative position and the meter time drive mechanism is operatively driving the meter.

Still further objects will appear from the following detailed description when read in conjunction with the accompanying drawings wherein:

FIGURE 3 is a longitudinal sectional view through FIGURE 2 looking in the direction of the arrows 3—3;

FIGURE 4 is a longitudinal sectional view through FIGURE 1 looking in the direction of the arrows 4—4;

FIGURE 5 is a front elevational view of the coin drive means of FIGURE 1 removed from the door casting and meter mechanism winding shaft of FIGURE 1;

FIGURE 6 is a side elevational view of the coin drive mechanism of FIGURE 5 viewed from the right of FIGURE 5;

FIGURE 7 is an elevational view of the movement and cam assembly viewed from the face normally disposed in opposed relation to the face of the coin drive mechanism depicted in FIGURES 1 and 5;

FIGURE 8 is a side elevational view of the movement and cam assembly of FIGURE 7 viewed from the right of FIGURE 7;

Figure 1:
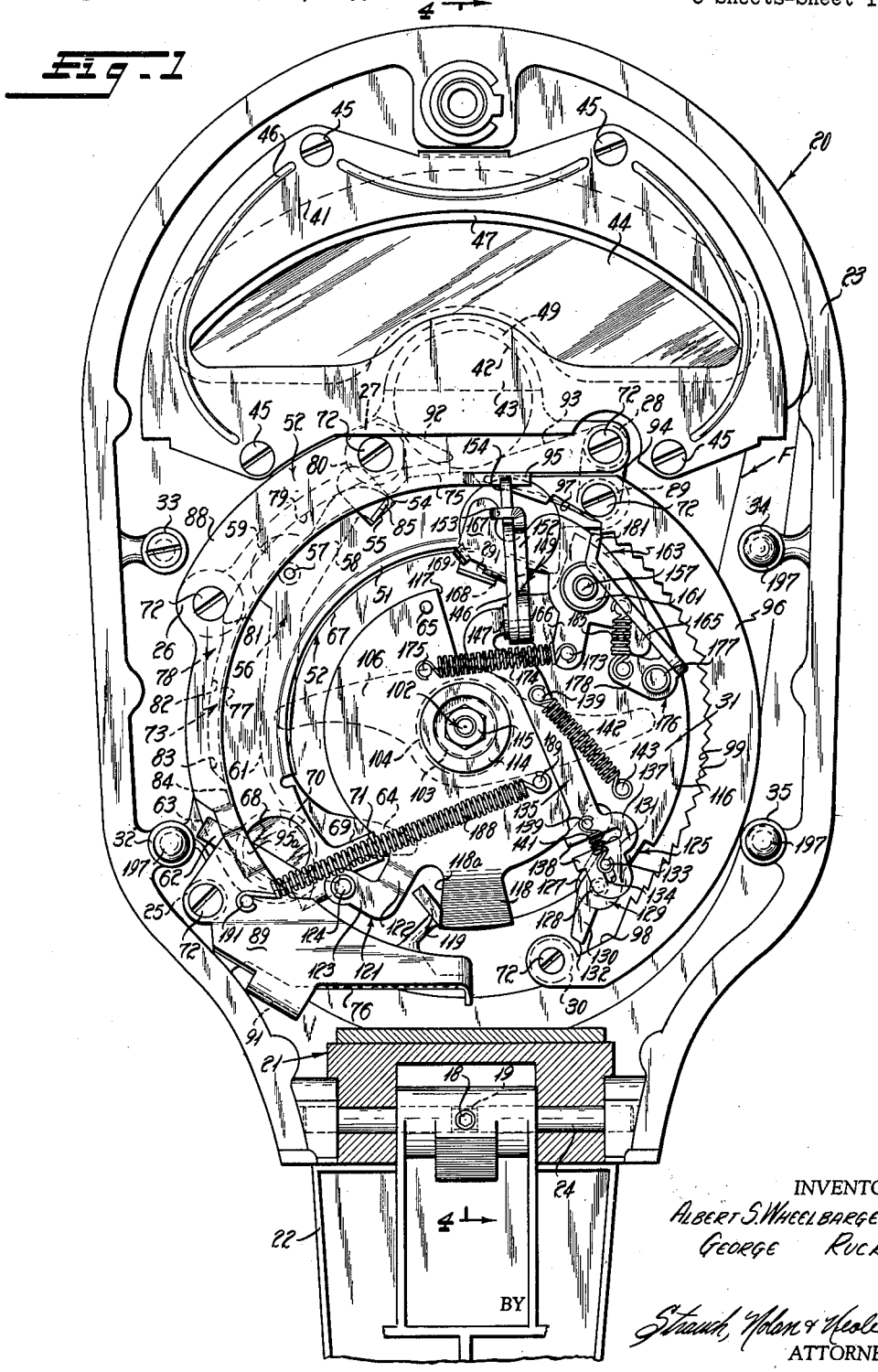
FIGURE 1 is a view taken along the line of juncture between the meter head casting and the mechanism supporting door casting looking into the door casting with the movement and cam assembly removed for the sake of clarity.

With continued reference to the accompanying drawings wherein the same reference characters are used throughout to indicate the same parts, the meter 20 of the present invention comprises a conventional two-part meter housing made up of a base member 21 housing a coin box (not shown) and adapted to be mounted in the conventional manner on a support post or the like (not shown) and a door casting 23 hingedly mounted upon base 21 by means of a hinge pin 24 which also mounts the coin box closure door 22 and is fixed against axial movement with respect to base 21 and door casting 23 in any suitable manner such as a retainer screw 18 entered into an annular recess 19 formed midway between the pin ends. As will be clear from an inspection of the FIGURES 1 through 6 of the drawings, the meter mechanism is suitably mounted on the inner wall face F of door casting 23 which, as is most clearly indicated in FIGURES 1 to 3, is provided with suitably tapped bosses 25 through 30 adapted to mount the coin chute and coin drive means 31 and mounting bosses 32 through 35, for mounting the meter clock and indicator flag unit 36 (FIGURES 7 and 8) including the clock mechanism, the indicating pointer and its setting mechanism 37 and expired time flag and its operating linkage 38.

Referring for the moment to FIGURES 1 through 4 wherein the door casting 23 is illustrated as it appears looking into the generally dish shaped casting with meter clock and indicator flag unit 36 removed, it will be clear that casting 23 at its upper end is provided with a window opening 41 formed midway of its lower edge with a coin insertion opening 42 protected by an outwardly protruding integral hood-like shield 43. Window opening 41 is preferably closed by a peripherally sealed window glass 44 held in place by screws 45 extending through suitably formed openings in the window glass and a backing plate 46. Also mounted in superimposed relation against the inner face of window glass 44 by screws 45 is a time indicating dial card 47 inscribed to indicate a two hour period in minute markings. To this end, casting 23 in alignment with screws 45 is provided with integral tapped bosses (not shown) laterally offset and disposed around the peripheral edges of window opening 41. The inner or back wall of coin insertion slot 42 is formed by an upstanding boss 49 formed on the arcuate cover plate of the coin chute assembly 52 which will now be described.

Figure 2:
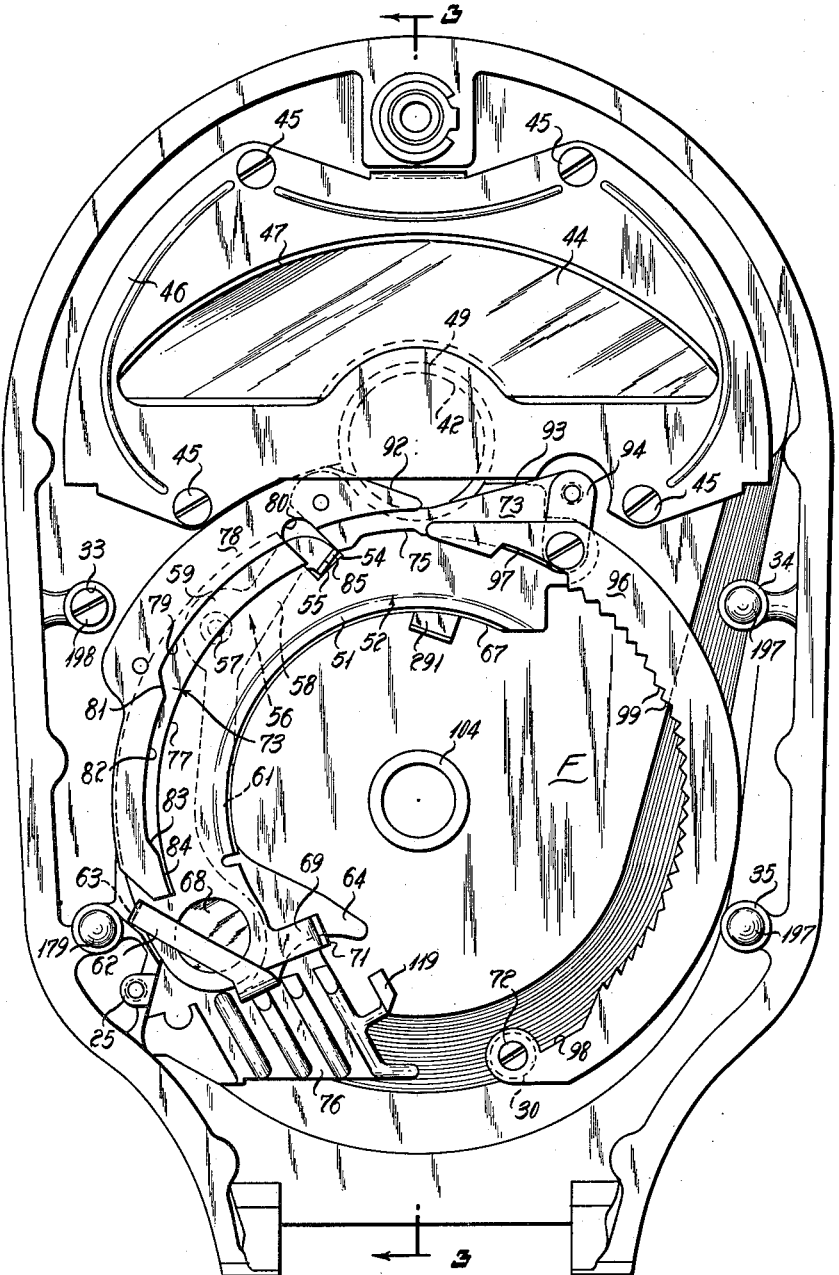
FIGURE 2 is a view similar to that of FIGURE 1 depicting the door casting with the chute cover plate and coin drive means removed.

Coin chute assembly 52 comprises arcuate backing or slide plate 51 extending froem the area of mounting bosses 28 and 29 in a counterclockwise direction as viewed in FIGURE 1 to a point approximately opposite and inwardly of mounting boss 25. Backing plate 51 is suitably notched between bosses 27 and 28 to encircle the lower portion of coin insertion opening 42 of casting 23. Plate 51 is also provided at a point counterclockwise of boss 27 with a peripherally opening notch 54 adapted to receive the upstanding right angularly bent end 55 of a coin release lever 56 journalled at 57 for limited movement between the body wall face F of casting 23 and the back face of plate 51 as best seen in FIGURE 3. End 55 of coin release lever 56 is formed at the tip of an inwardly curved portion of a lever arm 58 inwardly joined at its hub 59 to a longer lever arm 61 terminating adjacent the lowermost end of plate 51 in an ejector finger 62 formed integrally with and return bent around and over the lowermost end of plate 51 to terminate in a downwardly inturned tip 63 disposed to swing in closely spaced relation to the radial wall portion of plate 51 for a purpose to be presently pointed out. Coin release lever 56 adjacent ejector finger 62 is also provided with inwardly extending cam finger 64 arranged to positively engage with a coin release lever return pin 65 of coin drive means 31 to be presently described in detail. As clearly seen from an inspection of FIGURES 1 and 2, an inner peripheral marginal edge of backing plate 51 slopes upwardly and terminates in a narrow flat rib-like portion 67 extending from a point to the right of coin insertion slot 42 as seen in FIGURE 1 to a point stopping short of the opposite end of plate 51. Beyond rib-like portion 67 and in the end of plate 51 adjacent boss 25 of casting 23, the plate is formed with a circular opening and an inwardly directed finger 69 terminating in an upstanding stop lug 71 the purpose of which will presently appear. A transparent disc 68 is disposed in and closes a "bull's-eye" inspection opening 70 formed in the wall of casting 23 and has a portion extending into and closing the circular opening of plate 51. These aligned transparent covered openings display each successive coin passing through the chute assembly 52 to view externally of the meter until insertion of the next coin and operation of the setting mechanism by the next user.

Between mounting bosses 26 and 28 backing plate 51 is of sufficient width to overhang bosses 26, 27, 28 and 29 and is provided with through apertures to receive securing screws 72 (FIGURE 1) for fixing coin chute assembly 52 to casting 23. The peripheral margin of plate 51 extending throughout the arcuate length thereof from mounting bosses 28 and 29 to a point adjacent ejector finger tip 63 supports a generally arcuate filler plate 73 (FIGURE 2) forming a small diameter coin cam plate and suitably drilled at points in alignment with bosses 26, 27, 28 and 29 to freely pass securing screws 72 therethrough. Plate 73 is matingly notched adjacent coin insertion slot 42 and notch 54 of plate 51 to respectively clear the coin insertion opening in the wall of casting 23 and the upstanding end 55 of coin release lever 56. Immediately adjacent to and in clockwise relation to the notch provided to mate with backing plate notch 54, cam plate 73 is provided with an inwardly opening notch 75 extending throughout a predetermined angular increment of the inner edge face of cam plate 73. The bottom wall of notch 75 is spaced outwardly from the inner rib-like portion 67 of plate 51 to snugly engage the peripheral edge of a minimum diameter coin after it passes through coin insertion opening 42 into the receiving pocket of coin drive means 31 and upon initial setting rotation of coin drive means 31 toward its completed time-setting position to dispose the coin opposite notch 75. At this point in its movement, the diametrically opposed marginal portion of the coin rests on rib-like portion 67 of plate 51 with its adjacent edge portion abutting the opposing yielding wall portions of the coin receiving pocket in coin drive means 31. It will be appreciated, therefore, that the minimum diameter coin is gripped between the bottom wall of notch 75 and the opposing yielding wall portions of the pocket of coin drive means so that upon further setting rotation of coin drive means 31 the coin will ride along the inner edge of plate 51, be cammed out of notch 75 and inwardly with respect to backing plate 51 so that its inner edge protrudes a greater distance inwardly from rib-like portion 67. Upon continued setting rotation of coin drive means, the edge of minimum diameter coin will engage end 55 of coin release lever 56 in passing along backing plate 51 to positively move ejector finger 62 of coin release lever 56 downwardly and inwardly to positively force a coin disposed opposite transparent disc 68 toward the coin discharge opening 76 located just beyond the end of plate 51. It will also be appreciated that so long as the minimum diameter coin remains in contact with the cam portion 77 of plate 73 its maximum protrusion inwardly of rib-like portion of plate 51 will persist. Assuming, therefore, that the minimum diameter coin is an American dime and that a meter designed to provide two hours of parking time for a dime is desired, the cam portion 77 will extend continuously to a point just slightly beyond the end of rib-like portion 67 in order to assure a maximum time setting of the meter.

Small diameter coin cam plate 73 in turn abuttingly supports a combined maximum and intermediate diameter coin cam plate 78, which extends between the counterclockwise lower edge of coin insertion slot 42 and the end of small diameter coin cam plate 73. Cam plate 78 is suitably apertured opposite mounting bosses 26 and 27 to receive securing screws 72 and is notched at 80 opposite notch 54 of plate 51 to clear end 55 of coin release lever 56. The inner edge of cam plate 78 is provided with a first inwardly facing wall portion 79 extending halfway of the length of the cam portion 77 of coin cam plate 74 to an inwardly extending shoulder 81 adapted, upon engagement of the largest diameter coin, to cam the coin inwardly so that its inner edge protrudes a greater distance inwardly of rib-like portion 67 of plate 51 during the remainder of the travel of the largest diameter coin. It will, furthermore, be appreciated that the adjacent inwardly facing wall portion 82 of coin cam plate 78 is formed at 83 with a shoulder which provides an inwardly offset tip 84 which extends for about one-fifth of the length of the second inwardly facing wall portion 82 to provide a cam surface for camming an intermediate diameter coin further inwardly beyond rib-like portion 67 of plate 51. In this way, the selection of varying time settings in accord with the diameter of the respective coin is readily and simply effected since forcing the respective coins further inwardly of rib-like portion 67 for varying periods establishes setting conditions of varying time intervals enabling varying settings of the time mechanism to be effected. It will be appreciated, therefore, that if the largest diameter coin is an American nickel the present cam plate structure would be effective to set one hour's time on the meter, exactly one-half of the time set by travel of an American dime along the cam surface of the small diameter coin plate 73. Also, assuming the intermediate diameter coin is an American penny the present meter cam plates would set one-fifth of one hour's time or twelve minutes if the coin passing through the meter were a penny. In all cases, the coins will have minimal face engagement with the chute plates since all the coins will have one edge margin engaged by the narrow rib-like portion 67 of plate 51 and the diametrically opposite coin edges will have minimal corner contact with the radially disposed wall of backing plate 51 (the dime) or minimal contact between a marginal face edge of the coin and the upper exposed face portion of plate 73 leaving the major face portion of the coins spaced from and spanning the opposing area of the radially disposed wall of plate 51. As a result of this minimal contact the moisture from the fingers of a depositor resulting from finger contact with the opposite coin faces in inserting the coin in the meter is incapable during cold weather of freezing over a sufficient area of the coin faces and chute surfaces to effectively jam the meter during passage of the coin to its temporary rest position opposite the viewing window openings. Furthermore, it will be appreciated that a minimum diameter coin in travelling through the coin chute assembly will positively engage the broad end 55 of coin release lever 56 and forcefully propel any coin that may freeze at the window openings from its freezing contact and that the larger diameter coins will engage the elongated tip 85 of end 55 of coin release lever 56 in their passage through the coin chute to similarly positively actuate coin release lever 56. It follows, therefore, that any freezing of the coin adjacent the viewing window is forcefully broken up by this lever action to prevent jamming of the meter from this cause also.

The meter chute assembly 52 and the coin insertion slot 42 as well as the coin discharge passage or opening 76 are completed by a cover plate 88 formed integrally with boss 49 previously described. Cover plate 88 is of generally arcuate configuration and extends from mounting boss 28 past mounting bosses 27, 26 and 25 and beyond mounting boss 25 is provided with an upwardly inclined terminal portion 89 providing a coin deflector lug 91. As clearly seen in FIGURE 3, cover plate boss 49 opposite the coin insertion opening 42 rises above the plane containing the top edge of coin cam plate 78 and extends from immediately adjacent the near end of coin cam plate 78 in a clockwise direction to a point slightly beyond the coin insertion opening 42. Boss 49 together with the sloping end 92 of cam plate 78 and the slant face 93 of cam plate 74 defines a rightwardly directed coin insertion slot for directing coins toward the near end of backing plate 51. To prevent coins from passing clockwise around the end of backing plate 51, the clockwise end of coin cam plate 74 preferably provided has a spacer bar 94 of a thickness equal to that of coin cam plate 78 and apertured to receive securing screws 72 of mounting bosses 28 and 29 fixed to it in any suitable manner. Also as clearly appears from FIGURE 1, the inner marginal edge of cover plate 88 extends radially inwardly of the corresponding inner cam edges of coin cam plates 74 and 78 and immediately below the coin insertion slot has a portion deflected upwardly and then parallel to the radial wall of backing plate 51 to provide a camming finger 95, the purpose of which will presently appear. The inner marginal edge of cover plate 88 near the opposite end and immediately beyond the adjacent ends of coin cam plates 74 and 78 is similarly deflected upwardly and then generally parallel to the radial wall of backing plate 51 to provide a camming protuberance 95a in spaced overlying relation to ejector finger 62 of coin release lever 56. Closely adjacent mounting boss 25 the upper face of cover plate 88 is provided with an upstanding spring terminal stud 191 the function of which will be hereinafter pointed out.

Mounted between mounting bosses 29 and 30 in superposed spaced relation to the wall of casting 23 and in the general plane of cover plate 88 is an arcuate ratchet bar 96. The upper end of ratchet bar 96 is retained in place by the same securing screw 72 that secures backing plate 51, cam plates 74 and 78 and spacer 94 to mounting post 29. At its upper end, ratchet bar 96 extends in a generally lateral direction to the left to underlie camming finger 95 of cover plate 88 and is notched at 97 to provide an end clearance notch for a "full stroke" pawl provided on the coin drive means 31. At its opposite end, ratchet bar 96 is provided with a second end clearance notch 98 adapted to receive the previously mentioned "full stroke" pawl when the coin drive means 31 is in its normal rest position. The innermost edge of ratchet bar 96 throughout the area extending between the respective clearance recesses 97 and 98 is provided with a series of equal size ratcheting teeth 99 adapted to cooperate with the "full stroke" pawl of coin drive means 31 in a manner and for a purpose to be hereinafter pointed out.

Figure 10:
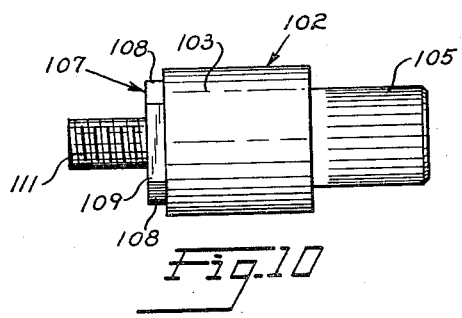
FIGURE 10 is a side elevational view of the meter winding shaft employed in the meter structure of of FIGURES 1-6.

While the coin chute assembly 52 and the ratchet bar 96 may assume any desired configuration depending upon the path of movement of the coin drive means 31, the present invention contemplates that these elements take the form of arcuate segments substantially diametrically disposed with respect to a drive shaft 102 laterally centered in the face wall F of casting 23 and disposed vertically below the coin inserted opening 42. Shaft 102 is shown in detail in FIGURE 10 and comprises a main body portion 103 of cylindrical configuration in cross-section journalled in the enlarged aperture of a centered boss 104 provided on the face wall F of casting 23, an outwardly protruding knurled end 105 non-rotatably receiving meter setting and winding handle 106, an axially directed boss 107 formed at the inner end of main body 103 by arcuate end faces 108 and diametrically opposed flats 109 (FIGURE 10) and a reduced diameter threaded shank 111. Boss 107 cooperates with centered matingly formed opening 112 of the coin drive means 31 shown in detail in FIGURES 5 and 6. The coin drive means 31 comprises a coin gauging disc assembly retained in place upon boss 107 by a cup-washer 114 freely journaled on shank 111 and a crown lock nut 115 threaded on the end of shank 111 to confine the main body 116 of the coin gauging disc assembly in place between the inner end face of shaft body portion 103 and cup-washer 114. As a consequence, the coin drive means 31 is freely journaled in centered boss 104 of casting 103 and fixedly connected to shaft 102 which is in turn prevented from axial disassociation from boss 104 by the free running abutting contact of the hub face of handle 106 and the under face of disc body 116 with the opposite ends of boss 104.

The coin gauging disc assembly is made up of main disc body 116 containing opening 112 the flat sides 110 of which parallel a center line inclined in a clockwise direction with respect to a vertical plane containing the axis of boss 104 through an angle of 43° (see FIGURE 5). Using center line C as a reference point and referring to FIGURE 5, the portion of disc body 116 to the left comprises a body portion defined by an approximately 150° arc formed around the center of opening 112 using a radius of 1.187 inches and terminating at its lower end at a point of intersection with a plane extending along a radius offset from center line C in a counterclockwise direction through an angle of 30°. Moving still in a clockwise direction, the next portion of body 116 is defined by an approximately 66° arc extending from the counterclockwise end of the first mentioned body portion and formed around the center of opening 112 using a radius of 1.25 inches. Moving again in a counterclockwise direction, the next body portion is defined by an approximately 98° arc extending from the counterclockwise end of the second body portion and formed around the center of opening 112 using a radius of 1.906 inches. Between the adjacent ends of the first and third body portions disc body 116 is recessed as indicated by numeral 117. It will be appreciated, therefore, that the arcuate peripheral edges of main disc body 116 are radially off-set with respect to one another and the axis of drive shaft 102 and that body recess 117 in the normal assembly of the meter as disclosed in FIGURE 1 lies adjacent the right hand end of the coin chute assembly 52. To assure the positioning of recess 117 in this desired position, the left hand end of the arcuate edge of the intermediate portion is formed with a radially outwardly extending, downwardly inclined stop lug 118 the edge 118a of which is adapted to abut against an upstanding lug 119 integrally formed on the inner face wall F of casting 23 to determine the normal inoperative position of the coin drive means.

Closely adjacent to and to the left of stop lug 118 the minor diameter portion of disc body 116 is provided with a radially outwardly protruding L-shaped lug 121 having its stem 122 inclined upwardly and its base leg 123 extending clockwise around the periphery of disc body 116 in a plane paralleling the plane of the body of disc 116. At its free end base leg 123 mounts an upstanding cam pin 124, the purpose of which will presently appear.

Disc body 116 along the edge of the major diameter body portion extending radially inwardly to join the intermediate diameter body portion is provided with a generally clockwise annularly extending finger 125 inclined downwardly at 126 and terminating in a mounting portion 127 lying in a plane substantially paralleling the face of disc body 116. Mounting portion 127 of finger 125 supports an upstanding pivot pin 128 adapted to journal a "full stroke" ratchet pawl 129 lying in the plane of the main body of disc body 116. As best shown in FIGURE 5 ratchet pawl 129 has a pair of generally oppositely extending arms 130 and 131. Arm 130 has its tip 132 shaped to ratchet over teeth 99 of ratchet bar 96 upon counterclockwise rotation of coin drive means 31 and to drivingly engage said teeth 99 upon clockwise rotation of the coin drive means 31 only under certain operating circumstances to be presently pointed out. In order to insure proper angular positioning of ratchet pawl 129 at all times during the rotation of coin drive means 31, arm 131 is provided with an upstanding spring anchor stud 133 adapted to be slidingly received in axial slot 134 of pawl operating link 135. As best seen in FIGURE 5 pawl operating link 135 comprises a main body portion 136 connected to the tip portion containing slot 134 by a laterally off-set integral loop 137. At the side edge of body portion 136 opposite that containing loop 137 the link is provided with a pair of laterally protruding axially spaced lugs 138 adapted in assembly of the coin drive means 31 to be grasped by a pair of pliers, a wrench or the like, and squeezed or spread apart to axially adjust the relative length of pawl operating link 135 with respect to the normal desired position of spring anchor stud 133 of ratchet pawl 129. The pawl operating link body portion 136 adjacent loop 137 is provided with an upstanding spring anchor stud 139 adapted to anchor one end of a tension spring 141 having its opposite end connected to anchor stud 133 of ratchet pawl 129. The opposite end of body portion 136 of link 135 is also provided with an upstanding spring anchor stud 139 adapted to anchor one end of a tension spring 142, the opposite end of which is connected to spring anchor stud 143 mounted on disc body 116 adjacent the loop 137 of link 135. Spring 142 is adapted to normally bias pawl operating link 135 axially outwardly across mounting portion 127 of finger 125 to engage the inner end of slot 134 with spring anchor stud 133 thereby normally urging ratchet pawl 129 in a clockwise direction around its pivot pin 128 to dispose arm 130 out of the path of the ratchet teeth 99 of ratchet bar 96. Link 135 at its end remote from ratchet pawl 129 is curved to the left as shown in FIGURES 1 and 5 and then back to the right and downwardly to form a depending journal portion 144 (FIGURE 6) adapted to connect the lowermost end of portion 144 of link 135 to the depending arm 145 of a generally L-shaped coin thickness gauging lever 146 mounted to rock in a plane at right angles to the radially extending wall of backing plate 51. As best shown in FIGURES 5 and 6 coin thickness gauging lever 146 is journalled on a journal pin 147 horizontally mounted in the upstanding ear 148 of mounting bracket 149. Mounting bracket 149 is preferably welded to boss 151 (FIGURE 5) formed along the right hand edge of recess 117 through means of the lower end of ear 148 and comprises a finger member 152 extending outwardly beyond the major diameter rim portion of disc body 116 and terminating in a laterally and downwardly extending latching element 153 located to overhang the end portion of outwardly extending cam leg 154 of coin thickness gauging lever 146 at a point directly above the depending feeler finger 155 (FIGURES 5 and 6) extending toward the radially directed wall of backing plate 51 adjacent rib-like portion 67. Since biasing spring 142 tends to slide link 135 downwardly and to the right as viewed in FIGURE 1, it will be appreciated that coin thickness gauging lever 146 will be normally biased in a clockwise direction around pivot pin 147 as viewed in FIGURE 6 to engage the leg 154 of lever 146 with the camming finger 95 of cover plate 88 when the coin drive means 31 is in its normal inoperative position. This same spring force continues to bias coin thickness gauging lever 146 in the same clockwise direction as the coin drive means 31 is rotated in a counterclockwise direction as viewed in FIGURE 1 so that the cam leg 154 passes down the inclined surface of camming finger 95 into engagement with the inner marginal edge of cover plate 88 so long as no coin is entered under feeler finger 155 while the coin thickness gauging lever 146 is in its normal, inoperative, raised coin receiving position adjacent coin insertion opening 42.

The major diameter portion of disc body 116 adjacent recess 117 is provided with an upstanding pivot stud 157 for mounting a coin diameter gauging arm. To this end, stud 157 (FIGURES 5 and 6) comprises a minimum diameter rivet stem 158 at one end, an immediately adjacent gauging arm pivot portion 159, an enlarged head portion 161 immediately adjacent pivot portion 159 and an upstanding shank portion 162. In assembling the coin diameter gauging arm 163 to disc body 116, arm 163 is first assembled on pivot portion 159 and the rivet stem 158 is then riveted to disc body 116 to rigidly fix pivot stud 157 to the disc body 116. To assure free pivoting movement of gauging arm 163, the axial length of pivot portion 159 preferably exceeds the thickness of arm 163 by a few thousandths of an inch assuring a running clearance of gauging arm 163 between head 161 and the opposed surface of disc body 116. As more clearly appears from FIGURE 5, coin gauging arm 163 comprises a relatively flat plate-like body 164 having generally peripherally spaced extension portions 165, 166 and 167 respectively forming clock-winding pawl assembly abutment finger, a spring anchor post support finger and a coin pocket forming arm. As will be clear from an inspection of FIGURES 1 and 5, portion 167 of coin gauging arm 163 has a pair of angularly related lugs 168 and 169 located respectively adjacent and inwardly of rib-like portion of plate 67 of back plate 51 and in partially overhanging relation to rib-like portion 67. Furthermore, lug 169 is disposed to the left of lug 168 as viewed in FIGURE 1 and is inclined at an angle of 45° to the plane of lug 168 to form a ledge disposed to engage the forward under edge of a coin entered through coin insertion opening 42 as heretofore described. As a result of this relationship of lugs 168 and 169 and the opposed coin engaging camming edges of small diameter coin cam plate 74 and combined coin cam plate 78, a coin passing through coin insertion opening 42 will pass downwardly between cover plate 88 and the opposed face of small diameter coin cam plate 73 until its lowermost edge rests upon lug 168 at which time the coin will be disposed in the coin pocket formed by the coin chute backing plate 51 and the unitarily movable lugs 168 and 169 and the extension portion 167 of arm 163. To prevent passage out of this pocket in a clockwise direction as viewed in FIGURE 1, the underface of the enlarged diameter portion of disc body 116 throughout its marginal edge is provided with an arcuate-shaped spacing segment 171 (FIGURE 5) having a notch 172 in its inner edge to clear the riveted over portion of pivot stud 157. This spacer element 171 is so positioned relative to backing plate 51 of coin chute assembly 52 that it will pass over the radially extending wall at a point inwardly of rib-like portion 67 during counterclockwise rotation of the coin drive means 31 and abuttingly engage the trailing edge of any coin deposited in the meter pocket heretofore described. As a consequence a positive driving force is applied to each coin in its passage through the coin chute assembly 52 so that the respective coins will be forcefully driven against the upstanding end 55 of coin release lever 56 to effectuate forceful removal of the previous coin from the "bull's-eye" window of the meter.

The spring stud finger extension 166 of coin gauging arm 163 is provided with a spring stud 173 adapted to support one end of a coil tension spring 174 the opposite end of which is connected to a spring anchor stud 175 fixed to main disc body 116 at a point to bias coin gauging arm 163 in a clockwise direction around its pivot stud 157. Such clockwise biasing movement of coin engaging arm 163 is effective through clock-winding pawl assembly abutment finger 165 to bias a clock-winding pawl 176 in a counterclockwise direction around its pivot stud 177 fixed in disc body 116 in predetermined spaced relation to pivot stud 157 in a manner similar to the attachment of pivot stud 157 to disc body 116. As clearly seen from FIGURES 5 and 6 clock-winding pawl 176 comprises a main body area and a short spring anchor stud bearing arm 178 lying in a common plane and a substantially oppositely related upstanding and counterclockwise extending pawl engaging finger 179 the free end of which is of dove-tail configuration as indicated at 181. Finger 179 at its end 181 extends outwardly of the edge of the major diameter portion of disc body 116 in substantially spaced relation above the disc body (FIGURE 6) to engage, whenever a coin cams coin-engaging arm 163 counterclockwise around its pivot stud 157, dove-tail portion 181 of coin-engaging finger 179 with one or another of the ten 9° angularly spaced pick-up lugs 180 of the rack ring 182 of the cam plate assembly 183 of the flag movement and cam unit 36, which will be presently described in detail. The clockwise trailing faces of lugs 180 are forwardly inclined at an angle of 10° to a radius passing through the intersection of the trailing faces of the lugs with the bottom wall of the space between lugs and the trailing face of the minimum diameter coin drive lug is located about 5° counterclockwise of a vertical plane containing the axis of rack ring 182 and diametrically opposed securing screw openings as viewed in FIGURE 7 to assure a proper relative angular relationship to drive end 184 of clock winding pawl 176. This counterclockwise movement of coin-engaging arm 163 is effective through the light coil spring 185 interconnecting the respective spring anchor studs 186 and 187 respectively carried by extension portion 165 of coin-engaging arm 163 and arm 178 of clock-winding pawl 176 to swing clock-winding pawl 176 clockwise around its pivot stud 177 to dispose finger end 181 in driving engagement with rack ring 182. A master tension spring 188 extending between spring anchor stud 189 fixed to disc body 116 and stud 191 of cover plate 88 of coin chute assembly 52 is provided to normally bias the entire coin drive means 31 to its normal coin-receiving inoperative position. The under face of the minor diameter and intermediate diameter portions of disc body 116 throughout their angular length to a point adjacent the counterclockwise side of stop pin 65 is provided with a spacer segment 191. As best seen in FIGURE 5, segment 191 and segment 171 previously described are preferably welded to the under surface of disc body 116 although any other suitable means of attachment might be used.

Figure 9:
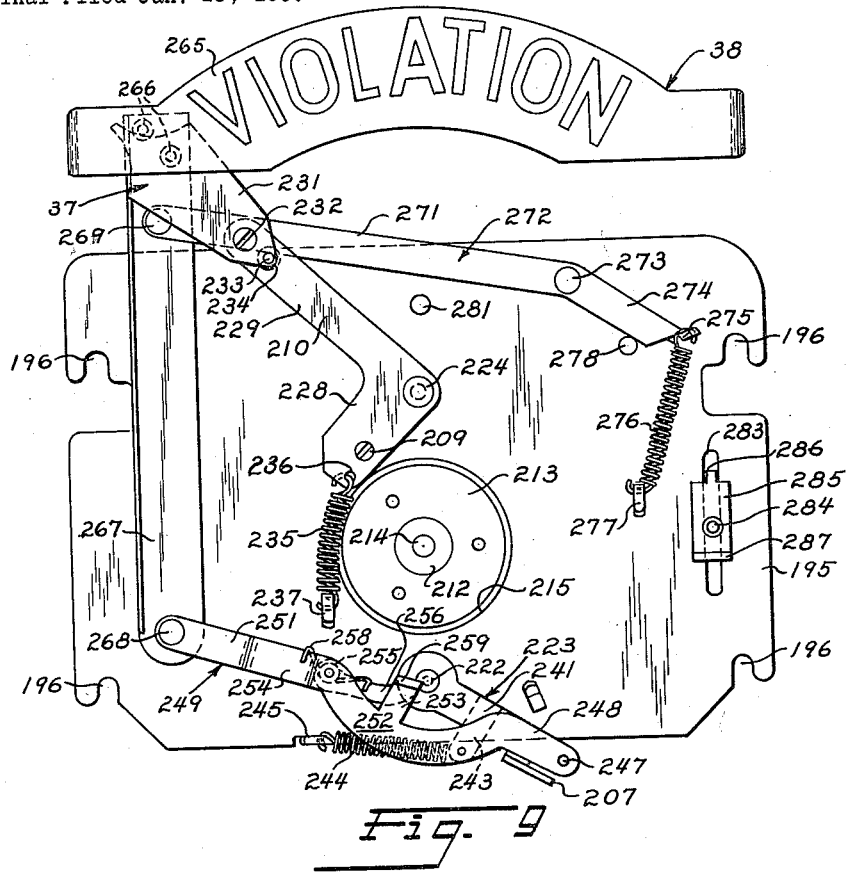
FIGURE 9 is an elevational view of the back plate, flag and linkage assembly and indicator assembly of FIGURES 7 and 8 with the rack and cam removed for clarity of illustration.

Referring now for the moment to FIGURES 7 through 9, the meter clock and indicator flag unit 36 is made up of clock mechanism 194, time indicator flag 37 and its associated linkage, expired time flag 38 and its associated linkage and cam plate assembly 183 all supported on a main mounting plate 195. Plate 195 is adapted by slots 196 suitably arranged in the opposite side edges to cooperate with headed mounting studs 197 (FIGURES 1 and 2) permanently fixed in bosses 32, 34 and 35 of door casting 23 and removable clamp screw 198 threadedly associated with boss 33 of door casting 23 to be fastened in place in operative juxtaposition to coin drive means 31. In this connection, it is to be understood that flag movement and cam unit 36 is disposed on posts 32, 33, 34 and 35 with the cam plate assembly 183 directly opposing coin drive means 31 and rack ring 182 in concentric encircling relation to the major diameter portion of disc body 116 and in a plane intersected by the wedge-shaped end 181 of finger 179 of clock-winding pawl 176. As most clearly appears from FIGURE 7, cam plate assembly 183 is made up of rack ring 182 and a substantially equal diameter mounting or cam plate 201 having mounting tabs 202 struck therefrom and standing upwardly to threadedly receive respective mounting screws 203 and 204 securing ring 182 and cam plate 201 for rigid unitary movement. As most clearly appears in FIGURE 8, screw 204 is of greater axial length than screws 203 so its end protrudes backwardly beyond the back face of plate 201 to form a limiting stop spaced 99° clockwise as viewed in FIGURE 7 from the initial drive lug trailing face of ring 182.

Cam plate 201 is provided with a concentric arcuate slot 206 adjacent its peripheral edge adapted to freely pass an upstanding hooked finger 207 formed on the expired time flag linkage to be presently described. Cam plate 201 also contains an arcuate slot 208 helically disposed with respect to the axis of plate 201 adapting it to serve as a cam slot to cam time indicator setting or cam pin 209 in a direction to swing indicator flag 37 and its supporting bell crank link 210 from its normally biased expired time position to the maximum flag setting, in the illustrated embodiment a setting to afford a user two hours of parking time. Cam plate 201 is centrally apertured at 211 to receive the hub 212 of a mounting plate 213 fixed to the clock spring or drive shaft 214 of clock mechanism 37. As clearly appears from a consideration of FIGURE 7, mounting plate 213 is dimensioned to freely pass through the centered aperture 215 formed in backing or support plate 195 and mounts cam plate assembly 183 for relative rotation with respect to backing plate 195 and the flag and indicator pointer linkage mounted for movement between cam plate 201 and backing plate 195. To this end mounting plate 213 is provided with three equi-angularly spaced tapped openings for receiving mounting screws 216. Cam plate 201 is also provided with a concentrically arranged slot 217 for slidingly receiving the shank of a clamp screw 218 threaded into and adapted to adjustably mount a segmental cam element 219 against the back face of plate 201. As seen in FIGURE 7, the inner edge of cam element 219 slidingly cooperates with the periphery of mounting plate 213 and its leading tip 221 is disposed to follow a path spaced a definite distance outwardly from the periphery of plate 213. Just beyond this path at a point directly below the axis of opening 215, plate 195 mounts a pivot stud 222 for pivotally supporting expired flag control lever 223. Directly above opening 215 in the plane containing the axes of opening 215 and stud 222, plate 195 supports indicator flag link 210. Link 210 comprises a bell crank pivoted at 224 on a pivot stud secured in backing plate 195 and having a short arm 228 carrying cam or setting pin 209 and a long arm 229 removably mounting an indicator pointer 231 by means of a clamp screw 232 threaded into the free end of arm 229 to force the depressed boss 233 at the free inner end of indicator flag 231 into a receiving opening 234 formed in arm 229. Pointer crank arm 210 is biased to its normal expired time position, an extreme counterclockwise position as viewed in FIGURES 7 and 9, by means of a tension spring 235 having one end secured in a spring attachment opening 236 in arm 228 of bell crank 210 and its other end connected to a spring retainer tab 237 formed by striking a portion of the backing plate 195 outwardly. Spring 235 is normally disposed to abuttingly encircle the peripheral edge of mounting plate 213 as most clearly shown in FIGURE 9.

Control lever 223 is inclined upwardly at 241 to dispose its free end 242 (FIGURE 8) in a plane offset from its pivoted end and is provided at one side of the sloping area 241 with a laterally extending spring securing ear 243 having one end of a biasing spring 244 secured thereto. The opposite end of biasing spring 244 is suitably secured to a tab 245 struck out of the metal of the edge of plate 195. This biasing spring normally biases control lever 223 in a clockwise direction as viewed in FIGURES 7 and 9 around the axis of its pivot pin 222 for a purpose to be presently pointed out. Lever 223 intermediate its free end and ear 243 carries hooked arm 207 which is preferably integrally formed along the edge of link 223. The free end of link 223 also carries a pivot pin 247 for pivotally mounting the end 248 of a latching link 249 the opposite ends 248 and 251 of which are axially offset and joined by an arcuate intermediate portion 252. Portion 252 has an abutment pivot finger 253 extending inwardly from its minor diameter edge in overlying spaced relation to the pivoted end of lever 223. As best seen in FIGURE 9, end 251 of lever 249 is disposed at the lower end of an axially extending downwardly inclined portion 254 extending toward plate 195 from the level of end 248 and arcuate portion 252 so that its extreme end lies substantially in a plane spaced above the plane of the pivoted end of lever 223 and intersecting the inclined portion 241 and lying between the planes of the opposite ends of link 223 as said link ends appear in FIGURE 8. It will be appreciated, therefore, that the arcuate portion 252 of latch lever 249 moves in a plane quite close to the back face of cam plate 201 and widely spaced from the opposing face of plate 195 (see FIGURE 8). Arcuate portion 252 adjacent the inclined portion 254 mounts a pivot stud 255 pivotally supporting a latch lever pawl 256 having an upstanding finger 259 lying in the path of finger 253 of latch lever 249. Pawl finger 259 is biased into normal contacting engagement with the end of finger 253 by means of a biasing spring 258 surrounding pin 255 and having its opposite ends respectively hooked around the inclined portion 254 of latch lever 249 and the body of pawl 256. Latch lever pawl 256 is adapted through its finger 259 to normally ride on the outer cam surface 261 of cam 219 during the normal setting and time dispensing operation of the meter between the cam surface 261 and the end of finger 253 of latch lever 249. Pawl finger 259 is effective upon expiration of the set time to be moved by engagement of pin 124 of coin drive means 31 with finger 207 of expired flag control lever 223 inwardly past tip 221 of cam 219 into the path of the leading end of cam 219 (FIGURES 1, 7 and 9). As a consequence, the time mechanism cannot be moved in a direction to set the meter for operation except upon insertion of a coin and proper operation of crank handle 106. It will be appreciated, therefore, that free time cannot be set up on the meter by unscrupulous users passing a wire through the coin slot and hooking the indicator pointer 231, its crank lever 210 or any portion of the cam assembly 183.

The expired time flag 38 comprises a pair of laterally spaced indicator plates 265 overlapping and fixed to each other at their opposite ends (see FIGURE 9). The resulting open ended flag signal is secured as by riveting 266 to the upper end of a support link or post 267, the lower opposite end of which is pivotally supported on the free end 251 of latch lever 249 by a rivet stud 268. Link 267 is maintained in upright position by reason of its pivoted connection at 269 to the long arm 271 of a crank arm 272 pivoted on a pivot stud 273 fixedly secured in backing plate 195. Arm 271 of bell crank lever 272 and arm 251 of latch lever 249 extend in general parallelism to one another in order that respective turning movements about their major pivot axes 247 and 273 will assure approximately vertical movement of link 267 and the attached flag plate 265 either upon movement of lever 249 around its pivot 247 upon release of finger 259 by cam 219 or clockwise swinging movement of lever 223 carrying pivot stud 247 upon release of finger 207 by pin 124 of coin drive mechanism 31 when mechanism 31 is moved in a direction to set time on the meter.

As clearly seen from FIGURES 7 through 9, the expired time flag, when disposed in its depicted position opposite meter window 41, hides the end of pointer 231 obscuring pointer 231 from view through the opposite meter observation windows. To assure proper positioning of the flag members 265 opposite the windows in this normally spring biased position of the expired time flag, the opposite arm 274 of bell crank 272 terminates in a spring attachment lug 275 adapted to be secured to one end of a tension spring 276 connected to a spring anchor tab 277 struck out of the metal of backing plate 195. As will be clear from an inspection of FIGURE 9, spring 276 biases bell crank 272 in a clockwise direction around its pivot pin 273 into contact with the expired flag positioning stop 278 fixed to plate 195 in a suitable position to properly locate the expired time flag plates 265.

Referring for the moment to FIGURE 7 and to FIGURE 1, it is to be understood that pin 124 of coin drive means 31 normally engages finger 207 of control lever 223 when the coin drive means 31 is in its normal coin receiving position illustrated in FIGURE 1. As a consequence, the free end of control lever 223 carrying pivot 247 normally assumes the dotted line position indicated in FIGURE 7. This dotted line or "home" position disposes abutment pivot finger 253 and pawl finger 259 in the path of cam segment 219, the position assumed when no time is available for parking, provided cam 219 is positioned as seen in FIGURE 7. In this position, the expired time flag is clearly visible and the position of the flag is determined by the abutment of arm 274 with stop pin 278 fixed also in backing plate 195. This position of the expired time flag 38 for the normal "home" position of the meter after all paid time has elapsed is readily obtained by loosening clamp screw 218 to free cam 219 and holding lever 223 in the "home" position then moving screw 218 in slot 217 counterclockwise from a position supporting pawl finger 259 to a point just sufficient to clear finger 259. Upon tightening of screw 218 the proper setting of the expired time flag 38 will have been established.

From the foregoing description, it can be ascertained that two operating conditions affect the position of the expired time flag. This flag is normally spring-biased by spring 276 to an exposed (or "expired" or "violation") position in the viewing windows 44. In order to retract expired time flag 38 to a nonviewable position, cam segment 219 must be moved clockwise from the position of FIGURE 7 into position to hold pawl finger 259 (and finger 253) downwardly and pin 124 must be in position to hold finger 207 upwardly. Thus, latch lever 249 is levered to pull the violation flag downwardly out of the viewing windows. If either one of these conditions is not present, the violation flag will show.

Adjacent the right hand edge of plate 195 as will most clearly appear from FIGURE 9, backing plate 195 is provided with an elongated slot 283 slidingly receiving the shank of clamp screw 284 threaded into the body of a stop member 285 formed with a positioning tab 286 at one end designed to ride in slot 283 and an upstanding abutment shoulder 287 located at its other end. This stop member 285 as most clearly appears from FIGURE 8 is adjustably positioned to be abuttingly engaged by the shank of screw 204 located adjacent the last pickup tooth 180 of ring 182 so as to determine the zero registering position of indicator pointer 231 and arrest driving movement of the clockwork 37 when the time paid for has expired.

From the preceding description it will be apparent that the expired time flag 38 will be held in its inoperative out of view position when time is set on the meter only so long as pin 124 holds control lever 223 in the dotted line position of FIGURE 7. It follows, therefore, that the expired time flag is displayed each time that crank handle 106 is operated to set time on the meter irrespective of whether the time indicator 37 has reached its normal home or zero position and will remain displayed until the coin drive means 31 is returned to its normal home or coin receiving position illustrated in FIGURE 1. Accordingly, the present meter, unlike its predecessors, will display the expired time flag in event the coin drive means 31 becomes jammed by freezing or for other reasons in any position other than its home or normal coin receiving position. It follows, therefore, that the present meter will immediately indicate a jammed meter by displaying the violation or expired time flag so that the meter inspector or patrolman may detect the situation and prevent meter cheating over an extensive length of time.

*Operation*

Assuming the coin drive means 31 is in its home or coin receiving position as illustrated in FIGURE 1 and that the flag movement and cam unit 36 is in its home or coin receiving position as shown in FIGURE 7, insertion of a coin into the coin insertion slot 42 will result in the coin falling into the pocket defined by fingers 168 and 169 of coin gauging arm 163 and the adjacent end of the spacing segment 171 in a generally canted position determined by the engagement of the opposite coin edges with the rib-like portion 67 of plate 51 and the face of the minimum diameter coin or dime cam plate 73. Counterclockwise movement of crank handle 106 as viewed in FIGURE 1 initially moves drive means 31 in a direction to withdraw pin 124 from finger 207 allowing spring 244 to swing lever 223 and lever 249 around their respective pivots 222 to carry pawl finger 259 radially outwardly from the axis of clock shaft 214 to the position shown in FIGURE 9 clearing the path for movement of cam segment element 219 to its time set position. This assures inoperative non-visible positioning of the expired time flag upon release of crank handle 106 upon re-engagement of pin 124 with finger 207 as return spring 188 returns drive means 31 to its home position. Continued counterclockwise rotation of crank handle 106 moves coin drive means 31 to drive the coin along chute assembly 52 and, in event it is a minimum diameter coin its uppermost edge will fall into notch 75 of cam plate 73. Continued counterclockwise driving movement of means 31 will cam the coin inwardly past rib-like portion 67 due to engagement of the opposite coin edge with the sloping wall at the counterclockwise end of notch 75. This camming action causes the coin to force coin gauging arm 163 to swing in a counterclockwise direction around its pivot stud 157 and tensioning spring 185 and thereby forcing finger 179 of clock winding pawl 181 into position to pick up the initial tooth 180 of rack ring 182. Further counterclockwise rotation of crank handle 106 thereafter drives the minimum diameter coin against upstanding finger 55 of coin release lever 56 to positively drive cam lever 56 in a counterclockwise direction around pivot 57 as viewed in FIGURE 1 to eject a previously deposited coin from the area of "bull's-eye" opening 70. Thereafter further counterclockwise rotation of handle 106 engages the coin edge opposite pocket fingers 168 and 169 with cam surface 77 to retain coin gauging arm 163 in its counterclockwise rocked position and maintain the tension on spring 185 causing clock winding pawl pickup finger end 181 disposed in the path of the appropriately related pickup tooth 180 to rotate ring 182 and cam plate 201 in a direction to wind the clock mechanism 37 and effect a commensurate setting of the time indicator flag 37. As cam 219 on cam plate 201 moves to position its cam surface 261 inwardly of latch lever arm finger 253 its associated pawl finger 259 is positioned to serve as a pivot for lever 249, thereby effecting a setting of the expired time flag mechanism in position to be lowered to its inoperative non-viewable position upon return of the coin drive means 31 to its home or coin receiving position of FIGURE 1 with pin 124 engaged with finger 207. During such setting movement of coin operating means 31 the finger 154 of coin thickness gauging lever 146 rides down off of cam 95 to engage feeler finger 155 with the upper coin face as viewed in FIGURE 1 thereby permitting spring 142 to slide full stroke pawl operating lever 135 axially downwardly as viewed in FIGURE 1 to rotate full stroke pawl 129 in a clockwise direction around its pivot pin 128 thereby moving tip 132 out of recess 98 into ratcheting relation to the teeth 99 of rack bar 96. As a consequence of this positioning of full stroke pawl 129, retrograde movement of coin drive means 31 in a clockwise direction so long as a coin is disposed beneath finger 155 of lever 146 is prevented. As soon as the coin reaches the end of cam surface 77 at a point adjacent but ahead of "bulls-eye" opening 70, finger 154 of lever 146 rides up onto cam surface 95a releasing the coin for immediate falling motion forwardly off of finger 169 into engagement with tip 63 and the base of finger 62 of lever 56 and the associated rib structure of the face F of casting 23 to maintain the coin supported opposite the bulls-eye 70 until forcibly released by the next inserted coin. The same action is effected by maximum and minimum diameter coins driven along chute assembly 52 in supported relation upon rib-like portion 67 of back plate 51 and the face of cam plate 74 immediately adjacent the edge faces 79, 82 and 84 of cam plate 73.

Whatever coin setting is effected, the clock drives cam plate 201 and ring 182 in a direction opposite that effected during the setting operation until time indicator flag reaches its zero indicating position determined by the position of pin 209 in cam slot 208 and cam element 219 returns to the dotted line position of FIGURE 7. At this time, pawl finger 259 rides off the end of cam element 219 and spring 276 snaps arm 274 of bell crank 272 against pin 278 thereby raising flag 38 to its visible position, such raising movement being permitted by rotation of lever 249 around pivot 247 held in the dotted line position of FIGURE 7 by engagement of pin 124 with finger 207.

It will be appreciated from the foregoing description of operation that the setting of the meter mechanism, the indicator pointer and the expired time flag is effected due to the coin camming movement of the coin gauging arm 163 in accord with the diameter of the coin and that the extent of setting operations depends upon the relative angular positioning of the cam surfaces of cam plates 74 and 78 and the pickup fingers 180 of ring 182. Accordingly, a meter embodying the construction of the meter of the present application can be readily adapted to accommodate varying diameter coins irrespective of the coin value by appropriately locating the respective cam surfaces 77, 82 and 84 angularly along the path of movement of the coin. Although the instant meter disclosure employs an arcuate coin path and rotatable coin drive means, it will be appreciated that longitudinally reciprocable coin drive means situated alongside of a longitudinally extending coin chute of the general cross-sectional configuration of that disclosed in the present application could equally well be employed. It will furthermore be clearly apparent that the anti-backup or full stroke pawl mechanism, which is operated by engagement of feeler finger 155 with a coin positioned in the coin pocket formed by fingers 169 and 168, will prevent retrograde movement of the coin drive means during setting of the meter mechanism. However, if no coin is disposed beneath feeler finger 155, lever 146 will be rocked downwardly under influence of spring 142 to shift link 135 axially sufficiently to swing tip 132 of full stroke pawl inwardly out of the path of ratchet teeth 99 and coin gauging arm 163 will not be rocked by the camming action of the coin to position clock winding pawl to pick up the complete assembly 183 of the setting mechanism. Consequently handle 106 and coin drive means 31 may be freely rotated without effecting any wear and tear on the vital parts of the meter so long as no coin is deposited in the meter.

If desired, an L-shaped stop member 291 may be fixed to wall F of meter casting 23 with its short leg protruding upwardly behind leg 168 of coin gauging arm 163 when the latter is disposed in its home position to prevent actuation of arm 163 until it passes away from the home position.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a multi-coin manually operable parking meter comprising a mechanism housing having an opening in its peripheral wall through which deposited coins pass to a coin box, a centered through shaft opening in a face wall, a coin insertion slot in a face wall and a meter mechanism mounted in said housing and including a windable clock mechanism, a time indicator pointer driven by said clock mechanism, an expired time indicator and a driven member for winding said clock mechanism and positioning said time indicator for timing operation: a coin controlled time setting mechanism for said meter mechanism comprising an arcuate coin chute extending between said coin insertion slot and said peripheral wall opening and comprising a generally radially disposed wall having an arcuate upstanding rib formation along its innermost edge and a radially outwardly disposed stepped passage defining wall providing a first continuous arcuate wall portion concentric with said shaft opening and immediately adjacent said generally radially disposed wall, said first arcuate wall portion cooperating with said upstanding rib formation to support and guide a minimum diameter coin in spaced spanning relation to said radially disposed wall and having a radially outwardly offset segment at its end adjacent said coin insertion slot forming with said first arcuate wall portion a shoulder portion adapted to cam a minimum diameter coin inwardly as it passes from said offset segment, a second continuous arcuate wall portion immediately adjacent said first continuous arcuate wall portion and comprising a first concentric arcuate segment of predetermined length cooperating with said upstanding rib formation and the side face of said first continuous wall portion to support and guide a maximum diameter coin in spaced spanning relation to said radially disposed wall and terminating at its end remote from said coin insertion slot in a second shoulder adapted to engage the edge of a maximum diameter coin as it passes from said coin insertion slot to cam said maximum diameter coin inwardly and merging into a radially inwardly offset concentric arcuate segment of predetermined length cooperating with said upstanding rib formation and the side face of said first continuous wall portion to support and guide an intermediate diameter coin in spaced spanning relation to said radially disposed wall and terminating in a third inwardly directed transition shoulder adapted to engage the edge of said intermediate diameter coin as it passes along said coin chute to cam said intermediate diameter coin inwardly, said third inwardly directed shoulder having a terminal concentric arcuate segment of predetermined length; a shaft journalled in said centered through shaft opening with its opposite ends protruding from the opposite ends of said centered through shaft opening; coin drive means fixedly mounted on the end of said shaft disposed in said housing and including abutment means engageable with the trailing edge portion of a coin disposed in the coin insertion slot, pivoted lever means biased to engage the inner edge portion and the unsupported face of a coin disposed in said arcuate coin chute, and a pickup finger engaged by a portion of said pivoted lever means and adapted, upon inward camming movement of said pivoted lever means by a coin moving through said coin chute, to drivingly engage said driven member of said meter mechanism; and manual crank means fixedly mounted on the other end of said shaft adapted to be grasped by a coin depositor to rotate said shaft and its associated coin actuated drive means to drive said coin along said coin chute to a point adjacent said peripheral wall opening and maintain said driven member engaged by said pickup finger for varying increments of rotation of said coin actuated drive means to set said meter mechanism for timed operation in accord with the diameter gauged value of said respective driven coins.

2. The multi-coin parking meter of claim 1 wherein the generally radially disposed arcuate wall of said arcuate coin chute is provided with a slot adjacent the coin insertion slot end and journals on its face oposite that upon which said upstanding rib formation is formed, a cam means having a first portion protruding through said slot into the path of movement of coins passing through said arcuate coin chute and a second portion having a coin receiving pocket adjacent said peripheral wall opening and adapted to retain a coin which has passed through said coin chute until the next succeeding coin forcefully engages said first portion to swing said cam in a direction to discharge said retained coin through said peripheral wall opening and said face wall containing said coin insertion slot is provided with a window opening at a point opposite said coin receiving pocket to permit inspection of used coins by responsible meter inspectors.

3. The multi-coin parking meter of claim 1 wherein said pivoted lever means comprises a pair of lever systems one of which has a member engaging the inner edge portion of the coins and means to hold said one lever system against relative transverse movement with respect to said arcuate coin chute until the newly deposited coin is driven past said coin insertion slot and the other of which has a member engageable with the unsupported face of the newly deposited coin prior to release of said one lever system and a ratcheting pawl moved to ratcheting position when said last mentioned member engages the unsupported coin face and said housing mounts a ratchet segment along the path of movement of said ratcheting pawl adapted to cooperate with said ratcheting pawl to assure only full unidirectional movement of the manual crank means and coin actuated drive means when a coin is once deposited in the coin delivery slot thereby preventing retrograde movement to secure a time setting greater than warranted by the size of the newly deposited coin.

4. The multi-coin parking meter of claim 1 wherein said expired time indicator has indicating and non-indicating positions and is carried by a linkage biased to dispose said expired time indicator in its indicating position and conjointly operating camming means are provided respectively on said coin actuated drive means and said driven member for engaging respective elements of said linkage to hold said expired time indicator in its non-indicating position only when said coin drive means is in its home position and during said timing operation.

5. The multi-coin parking meter of claim 1 wherein the pivoted lever means comprises an anti-reversing lever system for said coin drive means and a meter mechanism setting lever system comprising a pair of links respectively pivoted for rotation around pins paralleling the axis of said shaft and rigidly spaced from one another for unitary rotation in outwardly radially spaced relation around said shaft axis, one of said links having an arm the free end of which is disposed to move in an arcuate path in overlying relation to said generally radially disposed wall of said coin chute and having finger elements extending into juxtaposition to said arcuate upstanding rib formation and cooperating with said abutment means of said coin drive means to form a movable coin pocket adapted to position respective inserted coins for movement along said coin chute and also having a pair of generally oppositely related arms carrying spring posts, and the other of said links comprising a pickup finger normally lying for movement in an arcuate path adjacent said driven member and an angularly related arm lying adjacent one of the oppositely related arms of said one link and carrying a spring post; spring means interconnecting the spring posts of said adjacently related arms of said pair of links to normally bias said respective links in opposite directions around their respective axes, said pickup finger cooperating with a portion of the pivot pin of said one link to provide a normal relative position of said oppositely biased links; and selector spring means connected to the spring post of said other oppositely related arm of said one link and to a spring post rigidly related to said link pivot pins for rotation therewith around said shaft axis to urge said one link in a direction to yieldingly position said finger elements in engagement with the edge of said deposited coin at points generally diametrically opposite the points of engagement of said deposited coin with said stepped passage defining wall whereby upon inward camming movement of said coin said pickup finger will be swung outwardly by said one link to drivingly engage said driven member and remain drivingly engaged so long as said coin remains in engagement with its predetermined length arcuate segment of said stepped passage defining wall to effect a predetermined related time setting of said meter mechanism clock mechanism and time indicator pointer.

6. The multi-coin parking meter of claim 1 wherein the pivoted lever means comprises a meter mechanism setting lever and anti-reversing lever system for said coin drive means comprising a first link pivoted for movement in a plane at right angles to said radially disposed wall of said chute and having an arm terminating in a pair of right angularly related fingers one of which depends towards said radially disposed wall of said chute and has its free end disposed to move in a path overlying that portion of said radially disposed wall lying adjacent to said upstanding rib formation and the second finger of which extends crosswise of and in overlying spaced relation to said radially disposed wall at a level above the highest point of said stepped passage defining wall and a second angularly related depending arm; a second link pivoted at one end to said second arm and overlying said coin drive means with its opposite end having an axially directed pin slot therein; a ratcheting pawl pivoted on said coin drive means adjacent said opposite end of said second link and having a drive pin extending into said pin slot; spring means interconnecting said drive pin and said second link to bias said drive pin to the inner end of said pin slot and serve as a resilient draft connection between said second link and said pawl; a ratchet bar lying along the path of movement followed by said ratchet pawl during rotation of said coin drive means; and spring means biasing said links in a direction to swing said free end of said one finger toward said radially disposed chute wall and condition said one finger to serve as a coin sensing finger whereby said anti-reversing lever system will be operatively set only when a coin is disposed in said coin drive means.

7. In a multi-coin manually operable parking meter comprising a mechanism housing having an opening in its peripheral wall through which deposited coins pass to a coin box, a shaft opening in a face wall, a coin insertion slot in a face wall and a meter mechanism mounted in said housing and including a windable clock mechanism, a time indicator pointer driven by said clock mechanism, an expired time indicator and a driven member for winding said clock mechanism and positioning said time indicator for timing operation; a coin controlled time setting mechanism for said meter mechanism comprising a coin chute extending between said coin insertion slot and said peripheral wall opening and comprising a generally planar wall having an upstanding rib formation along one edge and an oppositely disposed stepped passage defining wall providing a first continuous wall portion extending along one side of said shaft opening immediately adjacent said planar wall and cooperating with said upstanding rib formation to support and guide a minimum diameter coin in spaced spanning relation to said planar wall and having an outwardly offset segment at its end adjacent said coin insertion slot forming with said first wall portion a shoulder portion adapted to cam a minimum diameter coin toward said one edge as it passes from said offset segment, a second continuous wall portion immediately adjacent but at a higher level than said first continuous wall portion and comprising a first segment of predetermined length cooperating with said upstanding rib formation and the upper side face of said first continuous wall portion to support and guide larger diameter coins in spaced spanning relation to said planar wall and terminating at its end remote from said coin insertion slot in a second shoulder adapted to engage the edge of a maximum diameter coin as it passes from said coin insertion slot to cam said maximum diameter coin toward said one edge and merging into a second inwardly offset segment of predetermined length cooperating with said upstanding rib formation and said side face of said first continuous wall portion to support and guide said larger coins in spaced spanning relation to said planar wall, said further offset segment terminating in a third inwardly directed shoulder adapted to engage the edge of an intermediate diameter coin as it passes along said coin chute to cam said intermediate diameter coin toward said one face, said third inwardly directed shoulder merging into a terminal segment of predetermined length cooperating with said upstanding rib formation and said side face of said first continuous wall portion to support and guide said intermediate diameter coins in spaced spanning relation to said planar wall; shaft means movably mounted in said through shaft opening with its opposite ends protruding from the opposite ends of said through shaft opening; coin drive means fixedly mounted on the end of said shaft means and disposed in said housing and including abutment means engageable with the trailing edge portion of a coin disposed in the coin insertion slot, pivoted lever means resiliently biased to engage the free edge portion and the unsupported face of a coin disposed in said insertion slot and passing along said coin chute, and a pickup finger engaged by a portion of said pivoted lever means and adapted, upon inward camming movement of said pivoted lever means by a coin moving through said coin chute, to be positioned to drivingly engage said driven member of said meter mechanism; and manual means fixedly mounted on the other end of said shaft means adapted to be grasped by a coin depositor to manually move said shaft and its associated coin drive means in a predetermined manner to drive said coin along said coin chute to a point adjacent said peripheral wall opening and thereby position said pickup finger and maintain said driven member engaged by said pickup finger during varying increments of movement of said coin drive means to set said meter mechanism for timed operation in accord with the diameter gauged value of said respective driven coins.

8. The multi-coin parking meter of claim 7 wherein the planar wall of said coin chute is provided with a slot adjacent the coin insertion slot end and journals on its face opposite that upon which said upstanding rib formation is formed, a cam means having a first portion protruding through said slot into the path of movement of coins passing through said coin chute and a second portion having a coin receiving pocket adjacent said peripheral wall opening and adapted to retain a coin which has passed through said coin chute until the next succeeding coin forcefully engages said first cam portion to swing said cam in a direction to discharge said retained coin through said peripheral wall opening and said face wall containing said coin insertion slot is provided with a window opening at a point opposite said coin receiving pocket to permit inspection of coins in said latter lever coin pocket by responsible meter inspectors.

9. The multi-coin parking meter of claim 7 wherein said pivoted lever means comprises an anti-reversing lever system for said coin drive means and a meter mechanism setting lever system comprising a pair of links respectively pivoted for rotation around pins paralleling the path of movement of said shaft means and rigidly spaced from one another for unitary movement along said path of movement, one of said links having an arm the free end of which is disposed to move in a path in overlying relation to said planar wall of said coin chute and having finger elements extending into juxtaposition to said upstanding rib formation and cooperating with said abutment means of said coin drive means to form a movable coin pocket adapted to position respective inserted coins for movement along said coin chute and also having a pair of generally oppositely related arms carrying spring posts and the other of said links having a pickup finger normally lying for movement in a path adjacent said driven member and an angularly related arm lying adjacent one of the oppositely related arms of said one link and carrying a spring post; spring means interconnecting the spring posts of said adjacently related arms of said pair of links to normally bias said respective links in opposite directions around their respective axes, said pickup finger cooperating with a portion of the pivot pin of said one link to provide a normal relative position of said oppositely biased links; and selector spring means connected to the spring post of said other oppositely related arm of said one link and to a spring post rigidly related to said link pivot pins for movement therewith along said path of movement, said selector spring means being adapted to urge said one link in a direction to yieldingly position said finger elements in engagement with the edge of said deposited coin at points generally diametrically opposite the points of engagement of said deposited coin with said stepped passage defining wall whereby upon camming movement of said coin said pickup finger will be swung by said one link to drivingly engage said driven member and will remain drivingly engaged so long as said coin remains in engagement with its predetermined length wall segment of said stepped passage defining wall to effect a predetermined related time setting of said meter mechanism clock mechanism and time indicator pointer.

10. The multi-coin parking meter of claim 7 wherein the pivoted lever means comprises a meter mechanism setting lever and anti-reversing lever system for said coin drive means comprising a first link pivoted for movement in a plane at right angles to said planar wall of said chute and having an arm terminating in a pair of right angularly related fingers one of which depends toward said planar wall of said chute and has its free end disposed to move in a path overlying that portion of said planar wall lying adjacent to said upstanding rib formation and the second finger of which extends crosswise of and in overlying spaced relation to said planar wall at a level above the highest point of said stepped passage defining wall and a second angularly related depending arm; a second link pivoted at one end to said second arm and overlying said coin drive means with its opposite end having an axially directed pin slot therein; a ratcheting pawl pivoted on said coin drive means adjacent said opposite end of said second link and having a drive pin extending into said pin slot; spring means interconnecting said drive pin and said second link to bias said drive pin to the inner end of said pin slot and serve as a resilient draft connection between said second link and said pawl; a ratchet bar lying along the path of movement followed by said ratchet pawl during movement of said coin drive means; and spring means biasing said links in a direction to swing said free end of said one finger toward said planar chute wall and condition said one finger to serve as a coin sensing finger whereby said anti-reversing lever system will be operatively set only when a coin is disposed in said coin drive means.

11. In combination with a parking or like meter having a coin insertion slot and a meter mechanism including a windable clock mechanism, a time indicator, an expired time indicator mechanism and means for winding said clock mechanism and setting said indicators: a coin controlled time setting mechanism comprising a coin chute extending from said coin insertion slot to a point of discharge and having a back plate one edge of which is formed with an upstanding coin support rib and the opposite edge of which is provided with an upstanding coin edge engaging cam wall providing a multiplicity of laterally offset wall segments of differing lengths and coin passages at its opposite ends respectively for entry of coins into and discharge of coins from said coin chute; and coin drive means mounted for movement relative to said chute and selectable varying length driving engagement with said means for winding said clock mechanism and setting said indicators, said coin drive means comprising a body member movable along said one edge of said back plate, a coin diameter gauging lever pivotally mounted on said body member for movement parallel to the plane of said chute back plate and having a first arm overlying a portion of said back plate and having angularly related coin edge engaging fingers disposed adjacent said one back plate edge and an abutment portion, a pickup drive pawl pivotally mounted on said body member adjacent said second arm and having an abutment arm engaging said second arm and a pickup finger movable from a normally inoperative position to an operative position to engage said means for winding said clock mechanism and setting said indicators throughout differing intervals of movement of said coin drive means relative to said chute, spring means biasing said abutment arm of said pickup drive pawl into abutting engagement with said abutment portion of said coin diameter gauging lever and said pickup finger toward its operative position and spring means to bias said coin diameter gauging lever in a direction to urge a coin in said chute toward said coin edge engaging cam wall whereby coins of differing value and diameter will be effective due to their respective engagement with the differing length wall segments to swing said pickup finger into operative position at different points along the path of movement of said coin drive means relative to said chute to effect respectively different settings of said meter mechanism.

12. The combination of claim 11 wherein said means for winding said clock mechanism and setting said indicators comprises a cam plate and rack ring assembly, said coin drive means comprises a rotatable disk coaxially disposed with respect to said rack ring and said rack ring comprises a series of equiangularly related, inwardly directed tooth formations arranged for selective engagement by said pickup finger.

13. The combination of claim 11 wherein said coin drive means comprises a coin thickness gauging lever pivotally mounted on said body member for movement at right angles to the plane of said chute back plate and having a first arm provided with a feeler finger overlying and extending toward said back plate at a point between said plate edges and a second arm swingable upon pivotal movement of said lever in a plane transversely of said chute back plate, a link pivotally connected at one end to said second arm for relative movement toward and away from said chute back plate and having a slot in its opposite end, a ratchet pawl journalled on said body member adjacent the slotted end of said link and having angular related arms one of which is shaped at its free end to form a ratchet finger, a ratchet bar fixedly disposed with respect to said coin chute with its ratchet teeth adjacent the path of movement of said body member portion mounting said pawl, spring means interconnecting the other pawl arm and said opposite link end to bias said ratchet finger toward said ratchet bar and spring means attached at one end to said body member alongside of said link and at its other end to said link adjacent its one end to normally bias said feeler finger toward said chute back plate and said link toward said rack bar thereby swinging said ratchet finger out of the path of said ratchet teeth so long as the free end of said feeler finger is not engaging a coin disposed in the pocket of said coin drive means and assuring ratcheting engagement of said ratchet finger and rack teeth to prevent retrograde movement of said coin drive means whenever a coin is in the pocket of said coin drive means.

14. The combination of claim 11 wherein said means for winding said clock mechanism and setting said indicators comprises a cam plate and rack assembly, said pickup finger engages said rack to impart setting movement to said cam plate and rack assembly, said cam plate has a cam segment adapted when said cam plate and rack assembly is disposed in time drive position, to lie in interfering relation to a part of said expired time indicator mechanism and said coin drive means includes a pin for engaging another part of said expired time indicator mechanism only when said coin drive means is in its home position, said cam and said pin cooperating to assure display of said expired time indicator whenever said coin drive means is in a position other than its home position or said cam plate is in its expired time position thus obviating undetectable jamming of the meter.

15. The combination of claim 14 wherein said expired time indicator mechanism comprises a generally longitudinally elongated flag, a flag support post fixed at one end to one end of said flag and extending away therefrom at approximately right angles, compound link support means journalled to the opposite end of said support post and composed of a control lever member pivoted to a support plate, a normally overlying latch link interconnecting the other post end to the free end of said lever member and spring means interconnecting a midportion of said lever member and said support plate and arranged to yieldingly retain said control lever and latch link in their normal overlying relationship, a crank arm support link journalled on said support plate and having a main arm generally parallelling said compound link support means and an angularly related arm and spring means connected to said angularly related arm and said support plate to bias said expired time indicator mechanism to its display position.

16. In a parking meter having a coin chute, coin drive means adapted to move a coin along said chute during a time setting operation, a meter housing having an inspection window in the wall thereof adjacent the discharge end of said chute, and a coin insertion channel communicating with the other end of said chute: a coin support and ejection mechanism for detaining a coin opposite said inspection window until a succeeding coin deposited in said coin drive means is moved along said chute comprising a trip member movably supported on said chute and normally biased to a position in the path of coins passing through said chute, said trip member coacting with a coin receiving pocket adapted to receive and detain a first deposited coin adjacent said window in the normal position of said member and having means thereon adapted, upon movement of a succeeding deposited coin along said chute into engagement with said trip member, to engage and positively discharge said first deposited coin from said coin receiving pocket and thereafter be released and returned to its normal biased position to receive and detain the succeeding deposited coin adjacent said window.

17. In a parking meter having a windable clock mechanism, a time indicator, means for winding said clock mechanism and setting said time indicator, a coin chute for guiding deposited coins therealong during a meter setting operation and: coin driving means mounted for movement relative to said chute and adapted upon engaging a coin in said chute during a meter setting operation to actuate said means: comprising a movable body member; a fixed ratchet mounted adjacent the path of movement of said body member; a ratchet pawl pivotally mounted on said body member for movement between positions of engagement and disengagement with said ratchet; pivoted lever means mounted on said body member including a portion engageable with a coin deposited in said chute; means drivingly connecting said pivoted lever means to said ratchet pawl; means resiliently biasing said pivoted lever means to a first position in which said ratchet pawl is held in its disengaged position, said lever means upon engagement of a coin in said chute being arrested in a second position effecting engagement of said ratchet pawl and said ratchet to prevent reverse movement of said body member so long as said pivoted lever means is in engagement with a coin in said chute.

18. In combination with the parking meter claimed in claim 17, cam means rigidly mounted adjacent the entrance end of said chute in position to engage a portion of said pivoted lever means and hold said pivoted lever means out of its first position during an initial portion of the movement of said body member whereby a deposited coin may be moved into engaged arresting relation to said pivoted lever means.

References Cited in the file of this patent
UNITED STATES PATENTS

| 1,061,093 | Long | May 6, 1913 |
| 2,221,578 | Gabrielson | Nov. 12, 1940 |
| 2,397,878 | Michaels | Apr. 2, 1946 |
| 2,660,283 | Broussard | Nov. 24, 1953 |
| 2,755,904 | Moore | June 24, 1956 |